Patented Dec. 1, 1925.

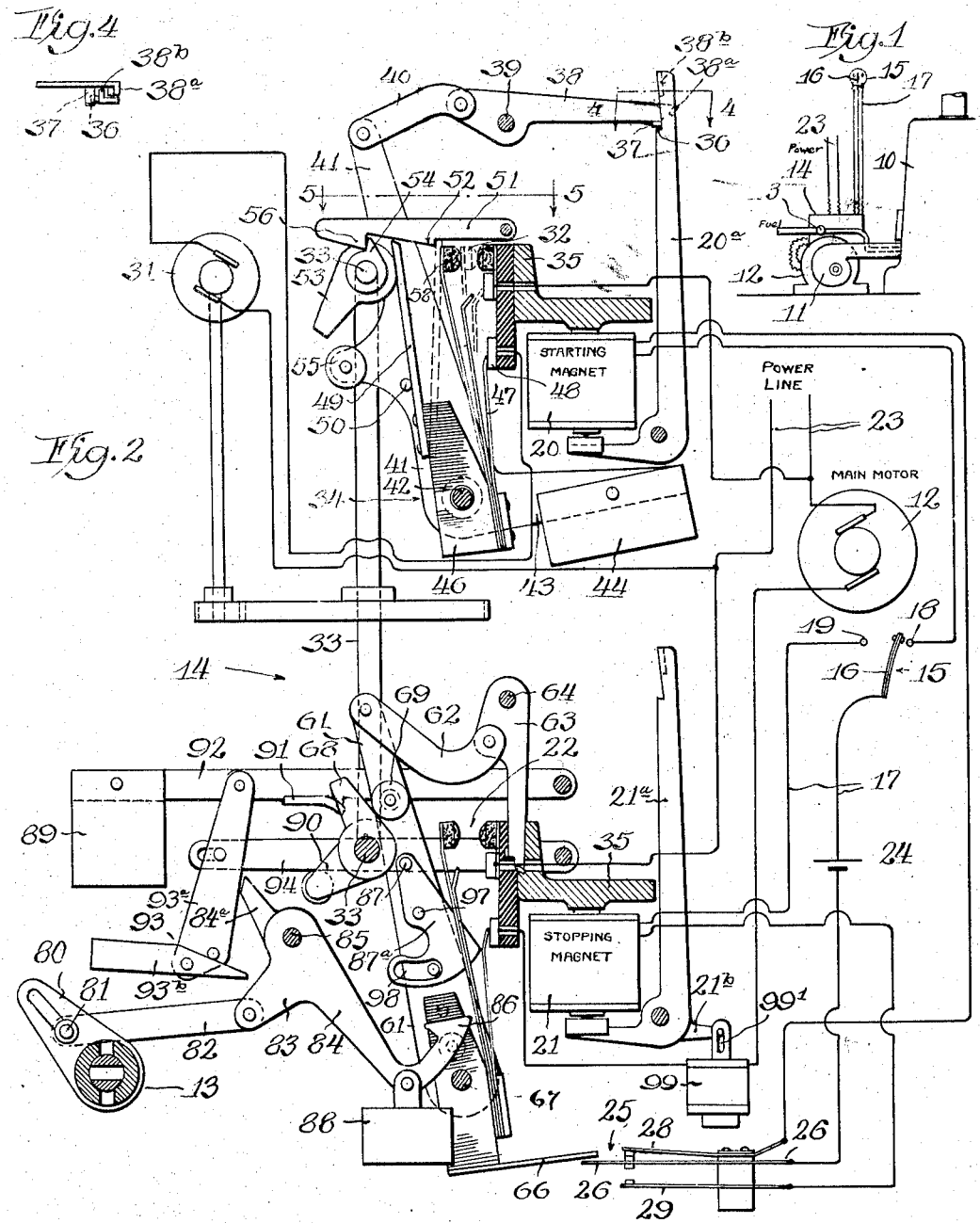

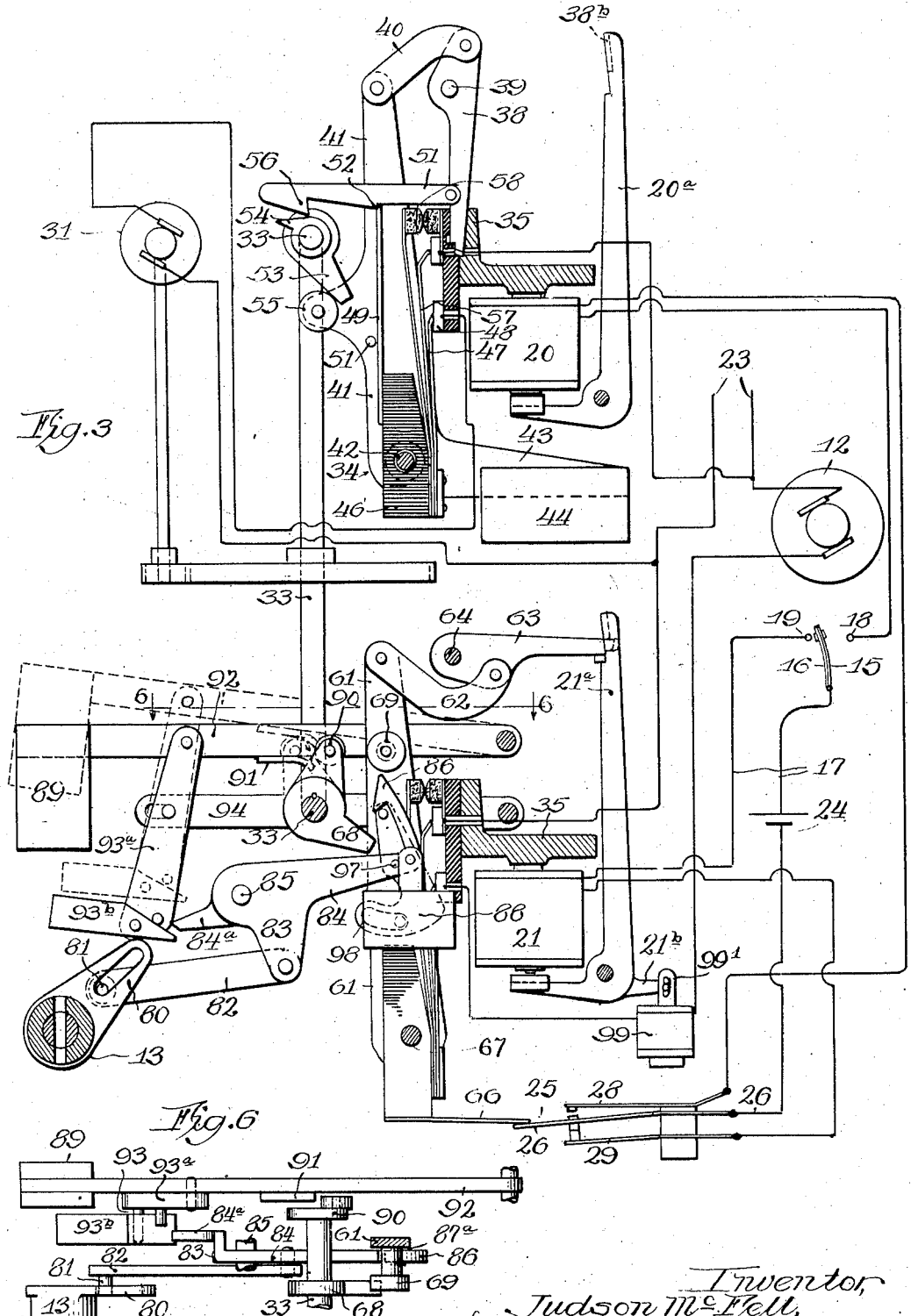

1,564,084

UNITED STATES PATENT OFFICE.

JUDSON McFELL, OF CHICAGO, ILLINOIS.

AUTOMATIC CONTROLLING MEANS FOR OIL BURNERS AND THE LIKE.

Application filed January 7, 1925. Serial No. 1,132.

*To all whom it may concern:*

Be it known that I, JUDSON McFELL, a citizen of the United States, residing at Chicago, in the county of Cook and State of Illinois, have invented certain new and useful Improvements in Automatic Controlling Means for Oil Burners and the like, of which the following is a specification.

An oil-burning heating equipment for household use instances one situation in which my present invention may be utilized with great advantage and is taken for explanatory purposes in the present case, although my invention may be employed, in many of its features, in other environments.

In an automatic heating equipment, it is common to employ an electric motor to operate an air blower for the oil-burning heater, and to cut the blower-motor into and out of operation by automatic agencies, thermostatically controlled. My invention provides improved controlling means for so doing, and at the same time controlling a fuel valve by which liquid fuel will be fed to the burner when the air blower-motor is in operation and will be cut off when the motor is idle.

To provide commercially satisfactory controlling means for such a heating equipment, requirements which are quite severe must be met. Inexpensiveness, compactness, practical infallibility and fool-proofness of the apparatus; capacity to operate for long periods of time with minimum deterioration or chance for derangement; power saving, protection of the electrical contact parts against arcing, safety factors, and simplicity of construction are some of the desiderata of the controlling device for such uses and all are attained by my invention. Further, it is highly desirable that the same controlling means shall govern both the air supply and fuel supply to the heater, with assurance of their appropriate and coincident operation, and with provisions for forceful operation of the valve which governs the fuel supply; all of which are things I attain.

To these and other ends, my invention consists in the combinations of elements and the features of construction and advantageous arrangement of parts hereinafter more fully described and specified in the claims.

In the drawings wherein I have illustrated a single embodiment of my invention for purposes of disclosure:

Figure 1 is a diagrammatic view (not to scale) illustrating one intended utilization of my invention;

Fig. 2 is a diagrammatic view of the mechanisms and circuits, with the mechanical parts in normal or "idling" position;

Fig. 3 is a similar view with the mechanical parts in certain working position;

Fig. 4 is a detail section on line 4—4 of Fig. 2;

Fig. 5 is a detail section on line 5—5 of Fig. 2;

Fig. 6 is a detail section on line 6—6 of Fig. 3.

While, in practical construction, those two portions of the controller which are diagrammatically shown as being one above the other, are arranged side by side, so that the shaft runs straight through them, clarity is served by the diagrammatic representation in spread-out arrangement.

In the general illustration, 10 is the heater supplied with air by blower 11 which is operated by an electric motor 12; while the liquid fuel supply is primarily controlled by valve 13. The blower motor 12, and preferably also the valve 13, are controlled in operation by the automatic control mechanism 14, the normal functioning of which is responsive to the operation of the thermostatic device 15 suitably located in a house.

The thermostatic device 15 involves, as usual, a thermally-moved blade 16 traveling between low and high temperature contacts 18 and 19, these being included in a local circuit 17 with the two stationary contacts connected with the respective "starting" magnet 20 and "stopping" magnet 21 of the controller. Thermostat closure of the circuit for starting magnet 20 ultimately results (through the functioning of the controlling mechanism) in closure of the motor switch 22 in the power circuit 23 for the blower motor 12 and in the coincident opening of the fuel valve 13. These working conditions are then maintained until the thermostat coacts with its other contact 19 to energize stopping magnet 21, whereupon the motor switch 22 is caused to open and the fuel valve 13 to close.

To insure safety from fire hazards, certainty of operation, and the prevention of arcing between thermostat contacts, it is practically of importance that the local thermostatic circuit shall require only a very small amount of current for a minimum amount of time and that the breaking of the local circuit be effected with a snap action. Therefore, in my construction, the magnets 20 and 21 are employed only to operate very readily movable or delicately responsive mechanical parts, requiring a minimum of power, and very shortly after either magnet has so functioned the circuit for that magnet is automatically broken before the just-established thermostat-contact will be thermally opened. This sort of action is provided for in the construction shown. Each electro-magnet, 20 and 21, has only to operate an armature-bearing trip-arm, 20$^a$ or 21$^a$ respectively, the work being so slight that a very small local battery 24 will supply requisite energy. Also a reversing switch 25 is provided in the thermostat circuit and is automatically operated by the controller 14 to break the circuit for either said magnets almost immediately after the circuit for that magnet has been energized. Thus one terminal of local battery 24 is connected to the central switch blade 26 of the reversing switch 25, this blade being normally sprung into contact with the leaf 28 which is connected, through magnet 20, with thermostat contact 18, while the remaining switch leaf 29 of the reversing switch is connected, through magnet 21, with thermostat contact 19. A member of the controlling mechanism 14 operates the reversing switch in such manner that, shortly after magnet 20 is energized blade 26 is depressed to open the battery connection for magnet 20 and close the battery connection for magnet 21; while shortly after energization of magnet 21 (through thermostatic connection established with contact 19) the stated member of controlling device 14 releases the reversing switch blade 26 which springs up to re-establish the battery connections for magnet 20. Since these reversing-switch operations are of prompt occurrence, it is substantially insured that the thermostat will never break an energized circuit connection, so that arcing never occurs in the thermostat; nor are the thermostat contacts required to carry any considerable amount of current or for any considerable length of time.

The main switch 22 for the blower motor of course handles power-current (such as 110 volt current) and should therefore be of rugged construction, forcibly operated to make its circuit, and also caused to break its circuit with a snap action, the switch construction being preferably such that copper contacts are employed to carry the continuing current, and carbon contacts supplement these, principally for taking the arc of circuit rupture.

To supply power for main switch closure and for operating the fuel valve 13 I employ a small auxiliary motor 31, which is itself controlled by a starting switch 32 (preferably as substantially the same construction as switch 22), the auxiliary motor being mechanically connected to drive the main shaft 33 of the control mechanism 14 from which the requisite power is supplied for effecting the automatic operations of the controlling device.

The controlling mechanism may be considered as divided into two sections, namely a starting section and a stopping section, the starting section controlling the operations of starting switch 32, and the stopping section controlling the operations of main switch 22. Each of these switches is biased to tend to spring to and stand in open position, as shown in Fig. 2. Starting switch 32 is, however, provided with mechanical closing means 34 adapted to be latched in potentiated position by the armature lever of starting magnet 20, such closing means being susceptible to restoration to potentiated position by power supplied from auxiliary motor 31. Latching means 51 for the starting switch 32 is preferably provided to hold said switch closed while such switch closing means is being again potentiated, and the release of such latching means is effected from the main shaft 33. This insures that on each starting of the motor 31 by closure of switch 32 the motor will run to a predetermined extent, operating shaft 33 until the latching device of the starting switch 32 is tripped from the operation of said shaft, whereupon switch 32 will again open, stopping the auxiliary motor. Meanwhile, during the operation of shaft 33, the main switch 22 for the blower motor 12 will have been closed by power supplied from the shaft 33, and the fuel valve 13 will have been opened, and these parts latched in their new position (shown in Fig. 3) so as to maintain the blower in operation with the fuel turned on until such time as stopping magnet 21 becomes energized, the latching means for the main switch and fuel valve being held cocked or latched by the armature lever of said stopping magnet 21.

Thus, in general, it will be understood that the particular cycle of operation for which the specific mechanism shown is provided, will be as follows: With the parts normally "idling" in positions as shown in Fig. 2, energization of starting magnet 20 will trip the switch closing mechanism for starting switch 32 which will be automatically closed, energizing the auxiliary m 31. Resultant rotation of motor drive shaft 33 will bring the parts of the stopping section to positions as shown in Fig. 3, closing the circuit for the blower motor, turning on the fuel supply, and operating the reversing switch 25 as shown. Momentarily (in the course of this running of the auxiliary motor) the condition in Fig. 3 will prevail, but on further rotation of the main shaft 33, the closing mechanism for switch 32 will be thrown back to potentiated position as indicated in Fig. 2, leaving the starting switch 32 latched as shown in dotted lines in Fig. 2, and then of the last operation of the running shaft 33, it will trip the latch for the starting switch 32 allowing the switch to spring open to the position shown in Fig. 2, thereby bringing about a condition where the starting mechanism stands in the position shown in Fig. 2 while the stopping section is conditioned as shown in Fig. 3, its parts being latched in such condition by armature lever 21ª. Energization of magnet 21, thereafter, tripping the last-mentioned latch, will permit self restoration of all of the parts of the stopping section from Fig. 3 position to Fig. 2 position, completing a full cycle of operation of the device.

Referring to the specific construction, 35 indicates (by various fragmentary parts) a suitable frame for the controlling device 14. In the starting section, armature lever 20ª has at its upper end a latch shoulder 36 coacting, as a trigger, with the point 37 of cocking lever 38 which is pivoted at 39 and bias link connection 40 with the upper end of a bell-crank lever 41 of the switch closing device 34, such lever being pivoted at 42 and carrying, on its horizontal arm 43, the relatively heavy weight 44 which, when released to fall, will snap the biased switch 32 closed. The movable parts of such switch are mounted on an insulating block 46 pivoted coaxially with arm 41 and constantly urged or biased toward switch opening position by the leaf spring 47 which bears on one fixed contact 48. A metallic plate 49 secured to the switch block receives, against its outer face, a pin 50 of the arm 41, making a one-way connection between these parts, and the upper end of the plate coacts with latching pawl 51 so that the tooth 52 of the pawl may latch the switch closed and hold it closed during such time as the weighted lever 41 is being moved back to potentiated position.

On the shaft 33, two cams are provided, at 53 and 54, respectively for throwing switch closing lever 41 back to potentiated position and for tripping the latch pawl 51 of said switch. These two cams operate sequentially, after the main shaft 33 has almost completed one revolution. As shown in Fig. 3, cam 53 comes into contact with the roller 55 carried by the lever 43 and, in sweeping past it, moves the switch closing lever from Fig. 3 position to Fig. 2 position. Almost instantly after this has been done cam 54, coacting with a suitable cam-part 56 of switch-latch-lever 51, raises the latter to trip the latch-connection at 52, the slight "coasting" of the auxiliary motor reliably carrying the main shaft forward the slight additional distance necessary to complete the escape of cam 54 past cam point 56. This permits the opening of switch 32, the copper contact 57 of which normally carries the current, while carbon contact 58 thereof, opening last, takes the arc. It will be apparent that when the starting-switch closer 34 is cammed back to potentiated position, its cocking devices will be latched again by the armature of magnet 20, if the latter is de-energized. De-energization of such magnet is assured by the operation of the reversing switch 25, and furthermore to assure that the armature will not stick or "freeze" by residual magnetism or mechanical sticking, the cam 53 is caused to slightly overthrow the cocking parts, and the end of cocking lever 38 is formed with a small cam surface 38ª which in overthrowing slightly past a projection 38ᵇ on the armature lever, will break the armature away from the magnet core if sticking has occured.

In the stopping section of the apparatus, the movable element of switch 22 is directly mounted on a pivoted arm 61, normally standing in switch-opening position. The upper end of said arm 61 is connected to a link and lever system, or cocking arrangement, by which the armature lever 21ª may latch the switch closed when the arm 61 is forced to switch-closing position. Link 62 connects the extremity of lever 61 with lever 63 which is pivoted at 64 and has its free extremity arranged for latching coaction with the armature lever kindredly to the arrangement heretofore described with respect to parts 20ª and 38. No weighting of lever 61 is necessary, since switch 22 may be of construction like that of switch 33 above described, and switch closure is directly forced by power supplied from the shaft 33. The switch-opening action is aided in part by the pressure of reversing switch spring 26 against the extension finger 66 carried by the lower end of lever arm 61 below its pivotal center 67, and obviously finger 66 will operate the reversing switch coincidentally with the closure of and opening of the main switch 22. Specifically, closure of the main switch is effected by a cam 68 on shaft 33, such cam coacting with a roller 69 directly mounted on the switch arm 61. As far as the mere operation of the blower motor is concerned, the parts described complete the necessary mechanism. As indicated in Fig. 2, cam 68 is so positioned on the shaft that closure of main switch 22 is effected almost immediately upon the starting of the motor shaft 33, and of course, once the main switch 22 is closed, it will remain closed and latched until magnet 21 is energized.

The further mechanism shown in connection with the stopping or releasing section have to do with control of the fuel valve 13 so that it may be opened and closed consistently with the starting and stopping of the blower motor 12, and may be very positively actuated in both directions to assure against failure in its functioning.

The fuel valve 13 has a slotted operating arm 80 with its slot affording bearing and connection for a pin 81 of the link 82 which is connected to a bell crank arm 83 of an operating lever 84, pivoted to the frame at 85. Mechanism operated by power shaft 33 serves to rock the operating arm 84 to throw the valve to open position and when this occurs the latching extremity 86 of the lever 84 engages and locks itself upon a detent-pin 87 carried by the main switch lever 61, subject to being released by movement of said detent from under the latch member when the main switch springs open. Thus, it is assured that the opening of valve 13 will be practically coincident with the running of the blower motor and that the valve will be automatically closed when the blower motor stops. Both for closing and for opening such valve, weights are preferably provided, such weight-operating mechanism being potentiated by the auxiliary motor 31. Thus a weight 88 is employed to close the valve, and a weight 89 to open it.

In specific construction, shaft 33 carries a roller-bearing cam 90 which, in sweeping past a plate 91 on the pivoted lever 92 which carries weight 89, raises said weight (as shown in dotted lines in Fig. 3) and then drops it. Lever 92 carries a pendant pawl device 93 comprising a link 93ª and a pawl proper 93ᵇ, the latter being knuckle-jointed to the link, and the link being guided, preferably, by a guide lever 94 paralleling the lever 92 and making slotted pin connection with the link 93ª. This is merely a simple form of mechanism for such coaction with the lever 84 that, on the raising of weighted lever 92, the pawl 93ᵇ may slip past a finger 84ª of the lever 84, and on the dropping of the weight, may drag down that finger, against the resistance of the lighter weight 88, throwing the valve 13 to open position and raising the lever end 86 to position where it may engage the latch 87 aforesaid. The latch pin 87 is yieldingly mounted, preferably being affixed to a weighted plate 87ª which is pivoted at 97 to the lever 61, a slot and pin connection between such parts being provided at 98 to limit the movement of the weighted plate. In various instances, as in this particular construction of the valve-operating and latching means, a smaller number of parts might be employed by using springs in lieu of weights, but the reliability of weight-actuated mechanism in devices intended for household use without especial care or supervision, dictates preferential employment.

Further, in order to insure that the fuel supply will be cut off if the blower stops because of failure of current supply from the main line, I provide means for initiating the restoration of the fuel valve to closed position independently of any energization of the stopping magnet 21. Thus, 99 indicates a solenoid arranged in the main line circuit 23 to hold its core elevated as long as the blower motor is receiving current, and to drop its core if the power line be broken, such core being operatively associated with the fuel-valve mechanism, and preferably with the main switch 22, to release the latter for restoration to their idle positions (closing valve 13 and opening switch 22) if the current-supply to said solenoid fails. The arrangement shown providing a lost-motion pin-and-slot connection 99' between the solenoid core and a bell-crank extension 21ᵇ of the armature lever 21ª suffices to serve these purposes. Manifestly, in the ordinary operation of the device the solenoid 99 plays no part and interferes in no way with the operations of the armature lever 21ª, because ordinarily main switch 22 is closed and the solenoid energized before the armature lever is required to exert its latching function, and also the main switch 22 is opened, as the result of the releasing operation of stopping magnet 21 before the solenoid drops its armature. However, should the power supply fail while the main motor 12 is in operation, the dropping of the solenoid armature will trip the armature lever 21ª causing the same restoration-action as though stopping magnet 21 had become energized.

It will be understood that while I have herein described in detail a particular embodiment of my invention which is simple, practical and desirable, many changes in construction and arrangement thereof might be made without departure from the spirit of my invention within the scope of the appended claims.

I claim:

1. In a system of the character described, the combination with a blower motor and a fuel valve, of a thermostat system involving a thermostat having high and low temperature contacts, a circuit therefor and a reversing switch in said circuit, and controller mechanism for operating the fuel valve and controlling the operation of the main motor comprising, in combination, an auxiliary motor, a switch therefor normally biased to open, mechanical switch-closing means adapted to be latched in cocked position, latching means therefor, an electro-magnet for releasing said latching means connected in the thermostat circuit, means operated by said auxiliary motor for potentiating said switch closing means for operation, a switch latch for holding said switch closed while the switch closing means is being potentiated, means operated by the auxiliary motor for releasing said switch latch; a main switch for the main motor, means operated by the auxiliary motor for closing said main switch, means for latching said switch in closed position, an electro-magnet for tripping said latch means arranged in the thermostat circuit; means for automatically operating said reversing switch to cut the first mentioned electro-magnet out of circuit upon closure of the main switch and to cut the second mentioned electro-magnet out of circuit upon opening the main switch; valve-operating means actuated by said auxiliary motor to open the valve, means for latching said valve in open position, means controlled by said second mentioned electro-magnet for releasing said latch, means for closing said valve when released; and means independent of said electro-magnet for releasing said valve-latch upon failure of current supply to the blower-motor.

2. In a system of the character described, the combination of a blower motor, a fuel valve and thermostatic means for initiating the operations of both thereof, and controlling means comprising a main switch for the blower motor, an auxiliary motor, power supplying means operable by said auxiliary motor for closing said main switch and opening said fuel valve, thereby potentiating both for automatic restoration, latching means for restraining both in potentiated condition, a "stopping" magnet for tripping said latched means controlled by said thermostatic means; a switch for said auxiliary motor, a "starting" magnet controlled by said thermostatic means, means for closing said switch normally latched in potentiated position and releasable by said magnet, and means operated by said auxiliary motor for potentiating said switch closing means.

3. In a system of the character described, the combination of a main motor, a valve, and thermostatic means for initiating the operations of both thereof to start and stop the motor and turn on and off the valve, and controlling means comprising an auxiliary motor, a switch for the main motor, means operated by said auxiliary motor for closing said main switch and opening said valve and potentiating both for reverse operation, means for latching both in potentiated condition, responsive to thermostat action to release both thereof; a switch for the auxiliary motor, means operated by said auxiliary motor to potentiate said switch for closing operation, means for latching the last said switch in potentiated condition, and thermostatically controlled means for tripping the last said latch-means.

4. In a system of the character described, the combination with a blower motor and fuel valve, of thermostatic means for initiating the starting of said motor and opening of the valve and the stopping of said motor and closure of the valve, and controlling means comprising a main switch for the blower motor, an auxiliary motor, means operated by the auxiliary motor for closing the main switch and opening the fuel valve, potentiating both for automatic return to opposite position, thermostatically controlled latching means for restraining both in potentiated condition; thermostatically controlled means controlling the closure of the last mentioned switch, and means operated by the auxiliary motor controlling the opening of the last mentioned switch.

5. In a system of the character described, the combination of a blower motor and a fuel valve, mechanical means for moving each thereof in one direction, an auxiliary electric motor, means operated thereby for moving said valve and main switch in the other direction, means for latching said valve and switch in common against the mechanically impelled movement, a switch for the auxiliary motor, mechanical means for moving said switch in one direction, means operated by said auxiliary motor for conditioning said switch for movement in the other direction, means for latching said switch against its mechanically impelled movement, and thermostatically controlled means for alternately releasing the latches of said main switch and said auxiliary switch.

6. A structure as set forth in claim 5 wherein the latch releasing means comprise two magnets in a thermostat circuit, and a reversing switch is incorporated in said circuit, automatically operated by a part of the controlling mechanism for breaking the circuit of each magnet shortly after the energization of said magnet to perform its latch-releasing function.

7. A structure as set forth in claim 5 wherein the auxiliary motor has a power shaft provided with cams timed to and co-operating with the controller part to cause the closure of the main switch and opening of the fuel valve prior to causing the opening of the switch for the auxiliary motor.

8. In a system of the character described, the combination of a main motor, a main switch therefor, means for automatically opening said switch, means for closing said switch, potentiating the same for opening, means for latching said switch in potentiated condition, an auxiliary motor for operating said means for closing and potentiating the main switch, an auxiliary switch for said auxiliary motor, means for automatically closing said switch, means for potentiating said switch closing means, means for latching the same in potentiated condition, said closing and potentiating means for the auxiliary switch being operated by power from the auxiliary motor, latch-releasing means for said switches, and thermostatic means controlling said latch releasing means.

9. A structure as set forth in claim 8 wherein the latch releasing means comprise magnets for the respective latches, and a circuit therefor including thermostatic means arranged to energize the respective magnets as the thermostat makes respective high and low temperature connections, and means for automatically breaking the circuit of each magnet shortly after its energization.

10. A structure as set forth in claim 8 wherein the latch releasing means comprise magnets for the respective latches, and a circuit therefor including thermostatic means arranged to energize the respective magnets as the thermostat makes respective high and low temperature connections, each said magnet having a latch releasing armature, and the latching devices providing means for forcing the armature away from the magnets, to prevent sticking or freezing, as the latching engagement is being effected.

11. A structure as set forth in claim 8, wherein the auxiliary switch is normally biased to open, and a switch closing means provided with automatic latching means releasable by the operation of said auxiliary motor.

12. Controlling means of the character described comprising an electric motor, a starting and stopping switch therefor, means operated by said motor for potentiating said switch for closure, means for latching said switch in potentiated condition, electro-magnetic means for releasing said latching means, a main switch, motor-operated means for closing said main switch and potentiating it for opening, means for latching said main switch in potentiated condition, electro-responsive means for releasing said latching means, and means for alternately energizing said two electro-responsive means.

13. In a device of the character described, the combination of an operating motor, a switch for starting and stopping the same normally biased to open mechanical switch closing means, latching means for holding said switch-closing means in potentiated condition, switch-latching means for latching said switch in closed position while said switch-closing means is being moved to potentiated condition, a cam shaft driven by the motor, cams on said shaft for moving said switch-closing means to potentiated condition and thereafter releasing the latch for the switch; a main switch to be operated, means on said cam shaft for closing said main switch, means for latching said main switch in closed position, and electro-responsive means for controlling the release of the last said latching means and the latching means for the first said switch closing means.

14. In a device of the character described, the combination of an operating motor, a starting and stopping switch therefor normally biased to tend to stand in open position, a mechanical switch closer associated therewith, a main switch to be operated, a shaft driven by said motor, means on said shaft for sequentially closing said main switch, potentiating the first mentioned switch closer and permitting opening of the first mentioned switch; means for latching the main switch in closed position, means for latching said switch closer in potentiated condition, and means for alternately releasing the latch for the switch closer and the latch for the main switch.

15. In a device of the character described, the combination of an operating motor, a cam shaft driven thereby, a starting and stopping switch for said motor, normally biased to spring open, a switch closer for said switch weight-potentiated to overcome said bias, latching means for latching said switch in closed position while said switch closing means is being moved to potentiated condition, a releasable latch for holding said switch closing means in potentiated condition, means on said cam shaft for restoring said switch closer to potentiated condition and thereafter releasing the switch latch, a main switch normally biased to stand open, means on said cam shaft for closing said main switch, a releasable latch for holding said main switch closed, and means for alternately releasing the latch for the first said switch closer and the latch for the main switch.

16. In a system of the character described, the combination of a main motor, a main switch therefor, a starting magnet, a stopping magnet, means responsive to energization of the starting magnet for closing said main switch, means responsive to energization of the stopping magnet for opening said main switch, a circuit for said magnets, a thermostat in said circuit for closing energizing connections to either said magnets as the thermostatic element moves in response to temperature changes, and automatic means for breaking the circuit of each such magnet promptly after the energization of such magnet.

17. In a system of the character described, the combination with a blower, a main motor therefor, and a fuel-supply valve, of thermostatic means for initiating the starting and stopping of the main motor, and control-means comprising a main motor switch, automatic means responsive to thermostatic operation for closing said main switch and opening said fuel valve, and automatic means for restoring said main switch to open position and said fuel valve to closed position upon subsequent de-energization of the main motor.

JUDSON McFELL.